Patented Oct. 31, 1922.

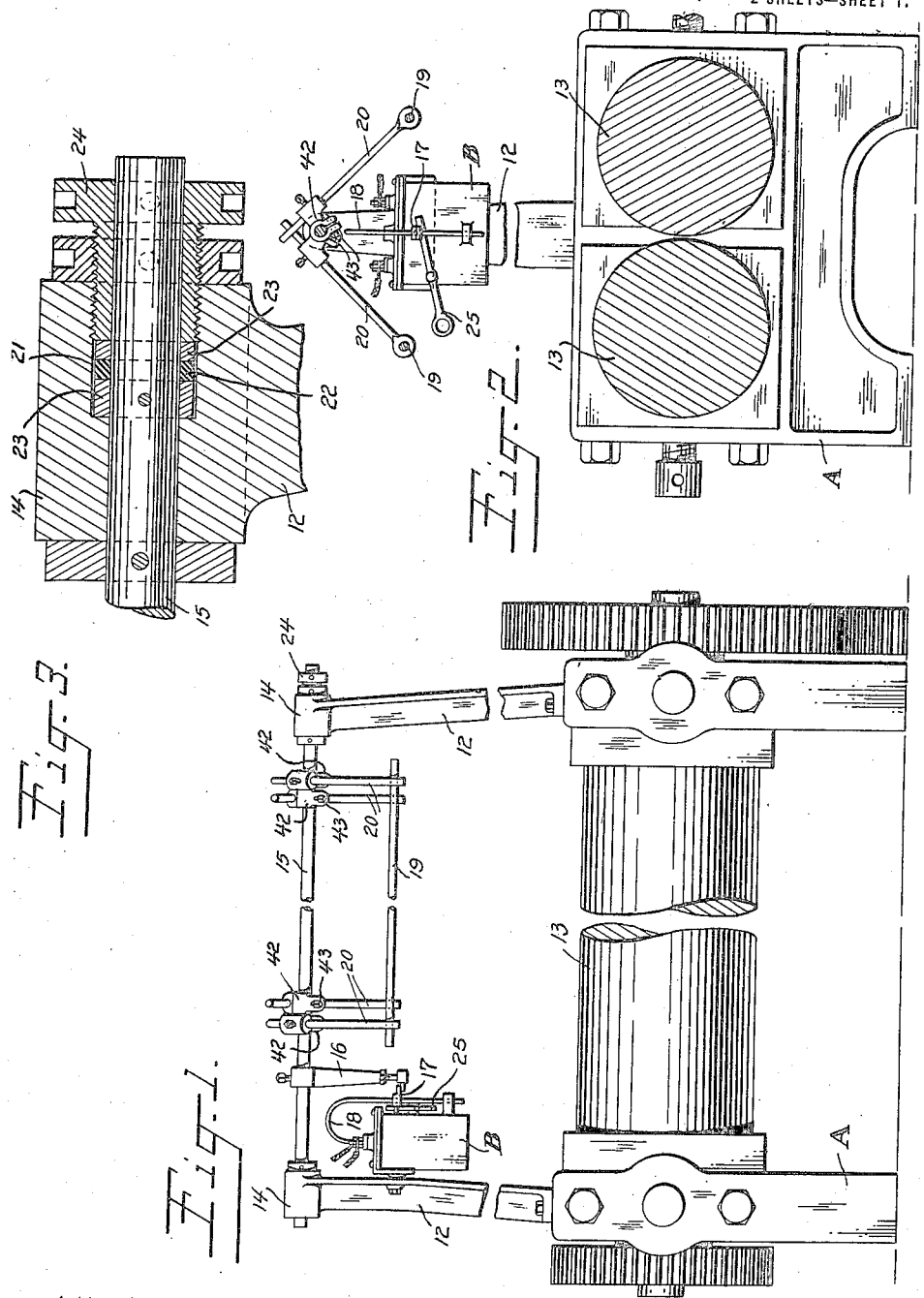

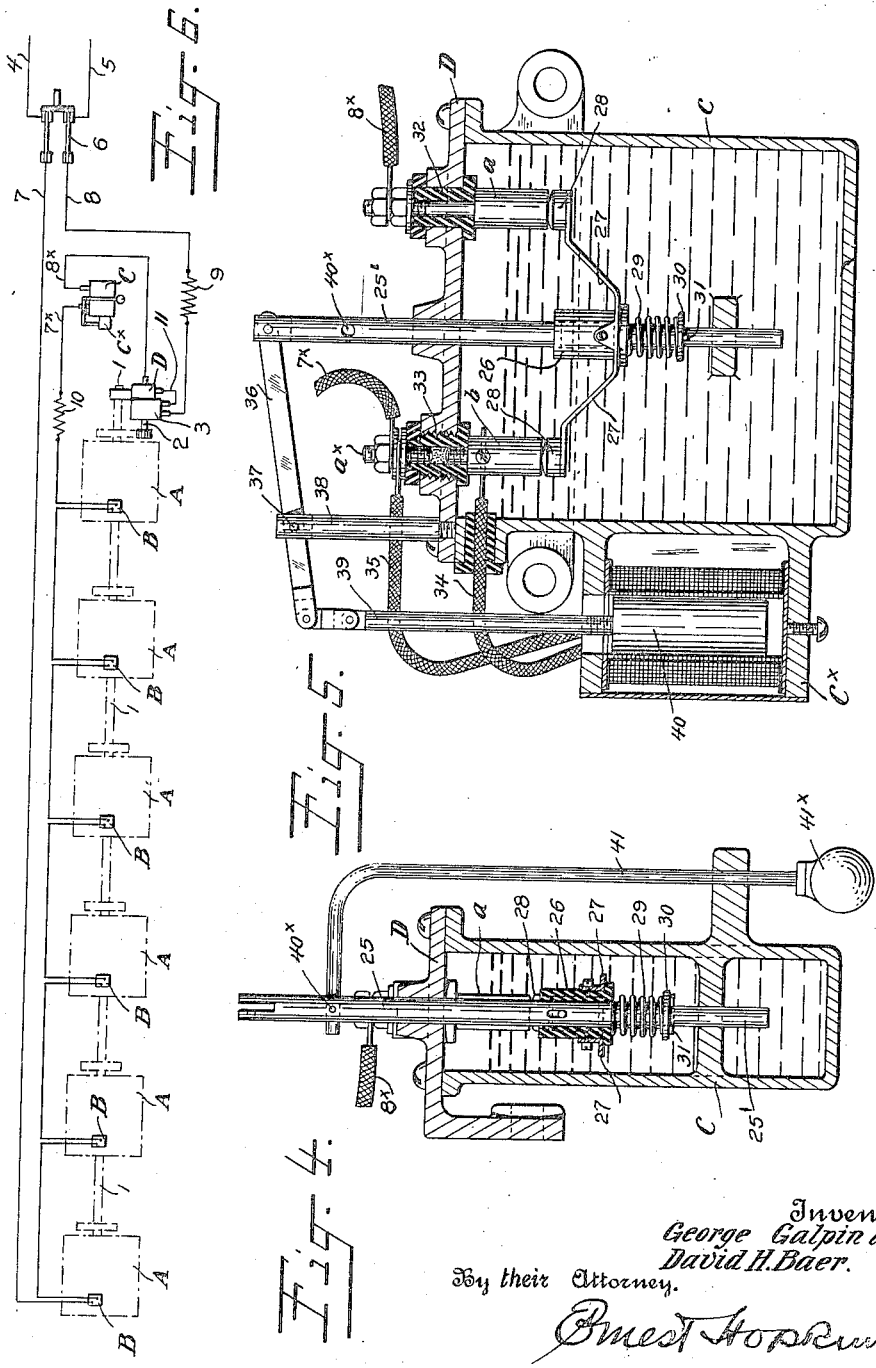

1,433,809

UNITED STATES PATENT OFFICE.

GEORGE GALPIN AND DAVID H. BAER. OF DETROIT, MICHIGAN, ASSIGNORS TO MORGAN & WRIGHT, A CORPORATION OF MICHIGAN.

ELECTRICALLY-CONTROLLED POWER CUT-OUT SAFETY DEVICE.

Application filed May 13, 1918. Serial No. 235,304.

*To all whom it may concern:*

Be it known that we, GEORGE GALPIN, a citizen of the United States, and DAVID H. BAER, a subject of the King of Great Britain, residing at Detroit, county of Wayne, State of Michigan, have invented certain new and useful Improvements in Electrically-Controlled Power Cut-Out Safety Devices, of which the following is a specification.

The invention has for its object to provide a safety device adapted for a train of machines, whereby the operator of any one machine may instantly stop the train of machines in case of accident in the operation of any one of them. For example, the invention may be applied to a train of crushing, grinding or mixing rolls driven from a common power unit. If an accident happens in the operation of a machine, any of the operators will be enabled to instantly stop the rolls and prevent injury, or further injury, and this by movement of a lever on or near each machine.

The apparatus consists of a driving member common to the machine units and an electrically controlled driving connection for the said driving member, a switch element for each machine unit, and a relay, the switch elements and relay being in circuit with the electrical control device.

The electrically controlled driving connection may be an automatic cut-out switch for the motor or engine, a clutch or equivalent mechanism for connecting and disconnecting a driving shaft common to the machine units from the source of power, or merely a motor in circuit with the switches and relay, as in the construction illustrated in the drawings.

In the embodiment of the invention illustrated in the drawings, a series of machine units are operatively connected with a common driving shaft, the latter being geared to the motor shaft, the motor shaft being provided with a brake device. Each machine unit is provided with a switch in circuit with the source of current leading to the motor and also in circuit with the relay. The operator of any one machine unit may, by disconnecting his switch, shut off current to the motor, permit the engagement of the brake to stop the rotation of the driving shaft, and also open the relay. The function of the relay is to prevent any operator from carelessly starting up the machines, by closing the open switch, without warning and before the cause for stopping has been completely taken care of. The relay is of such form as to require manual operation to engage its contacts, the contacts being held into engagement by a solenoid and a counterweight serving to disconnect the contacts when the circuit is broken through the solenoid.

The invention may be understood by reference to the accompanying drawings, in which:

Fig. 1 is a front elevation of a machine unit provided with a switch and operating means therefor, and Fig. 2 is a sectional end view of the same.

Fig. 3 is a detail sectional view illustrating a frictional grip for the switch operating shaft.

Fig. 4 is a sectional end elevation of the relay, and

Fig. 5 is a sectional side elevation of the same.

Fig. 6 is a diagrammatic view illustrating the wiring.

The diagrammatic plan in Fig. 6 of the drawings, illustrates a series of machines A equipped with the improvement, the machines being operated by a common drive shaft 1, the latter being geared to the shaft 2 of an electric motor 3. The motor 3 receives its current from the main feed wires 4, 5; the said feed wires being connected by means of master switch 6 with the wires 7 and 8, the latter wire being connected to a terminal of the motor 3 via the resistance coil 9. Wire 7 leads to a switch B on or connected to the outermost machine, each machine being provided with a similar switch in circuit with the motor, the switch on the machine nearest the motor having a terminal connected with a resistance coil 10, the latter in turn being in circuit through wire 7$^\times$ with a relay C, the relay being in circuit through wire 8$^\times$ with a brake operating device D, and the latter being connected through wire 11 with a terminal of the motor 3.

Each switch B may be of any suitable construction. In Fig. 1 of the drawings we have illustrated one of the switches secured to one of two bracket arms 12 rising from the frame work of a mixing machine having the rolls 13. The bracket arms 12 support between them in the bosses 14 an oscillatory shaft 15 having an arm 16 in engagement with a projecting member 17 of the switch operating arm 18. In its position illustrated in Fig. 1, the member 17 rests upon arm 16 and thus serves to hold switch arm 18 in its uppermost position, and thus to hold the switch closed. By imparting a slight turning movement to shaft 15, however, arm 16 may be withdrawn from member 17 to permit the descent of switch arm 18 and the opening of the switch. By reference to Fig. 2 it will be seen that shaft 15 may be given a turning movement from either side of the machine by manipulation of one of two rods 19 each of which serves to connect two spaced arms 20 clamped upon the shaft 15.

To frictionally hold the shaft 15 in any position to which it may be moved, one or both of the bosses 14 may be provided with an enlarged recess 21 surrounding the shaft 15, to receive an expanding washer 22 intermediate the rings 23, the washer being expanded by the pressure of a screw, the latter being threaded in the said boss and having a thumb piece 24. For elevating the switch rod 18 to close the switch and return the contact member 17 in position for engagement by arm 16, a lever 25 may be fulcrumed upon the switch housing to engage the inner end of contact member 17, as illustrated in Fig. 2.

The relay comprises a main casing C and a solenoid casing $C^x$. In the main casing is mounted for vertical movement a rod $25'$ which carries an insulating block 26. Secured upon the insulating block is a bridge piece 27 having at each end a contact piece 28. When the rod 25 is in its uppermost position the contact pieces are held in firm contact with the terminal contacts $a$ $b$ by a spring 29 surrounding the rod below the insulating block 26 and supported upon a washer 30 held in position by a pin 31. The terminal contact $a$ has a reduced stem which passes through an insulating bushing 32 fitted in the cover D of the casing, and its upper end is threaded to receive suitable binding nuts for the wire $8^x$ leading to the brake and motor assembly. The terminal contact $b$ has a stem threaded in the lower end of an insulating bushing 33 in the cover D and is electrically connected with its binding post $a^x$ for wire $7^x$, through wire 34, the solenoid in casing $C^x$, and wire 35, binding post $a^x$ being threaded in the upper end of bushing 33 and a suitable insulating material being placed intermediate the stem and post, as illustrated in Fig. 5.

The rod $25'$ at its upper end is connected with a lever 36 fulcrumed at 37 upon a post 38 rising from the cover D. The lever 36, in turn, is operatively connected with a rod 39 connected with the solenoid core 40. The action of the solenoid is to normally hold the core 40 in the position shown in Fig. 5. However, when the circuit is broken by the opening of any one of the switches B, the rod $25'$ and contacts carried thereby will fall by gravity and the core 40 will be raised to such a height as not to be operatively affected by the reenergizing of the solenoid winding by the closing of the open switch B. The arrangement is such that rod $25'$ must be manually lifted to again move the core 40 to a position where the solenoid is again effective to hold the contacts in engagement, and for such purpose we have shown a rod 41 connected to rod $25'$ at $40^x$ and having a handle piece $41^x$.

The bracket arms 12 of the switch opening mechanism may be made of a standard size, and the levers may be lowered or raised for different sized machines. To this end the levers are clamped within sleeves 42 on shaft 15 by means of the set screws 43, which permit the aforesaid adjustment. The arrangement of rods and levers 19, 20 provides easy switch opening means within the reach of the operator at both sides of each machine and throughout the length of the latter. The relay is designed to be installed at a point distant from the machine and under the control of a responsible person in charge thereof.

In the claims the term "driving connection" refines any intermediary between the source of power and the machine drive shaft, such, for example as the motor illustrated in the drawings, or a clutch between the motor or any driving device and the machine drive shaft. When a clutch is employed it may be of the usual magnetic type maintained in engaged position by the current and free for movement to disengaged position by springs or other devices upon the opening of the circuit at the switch and relay. Such clutch members are common and do not require further description here.

Having thus described our invention what we claim and desire to protect by Letters Patent is:

1. A safety switch having stationary and movable contact members, the latter of which is normally held away from the former by gravity, means for sustaining said movable contact member in position against the stationary contact member including a trip independent thereof, and manually operable means frictionally retained in any position to which moved for moving the trip to free the movable contact member therefrom and to the action of gravity whereby the circuit may be quickly opened.

2. In devices of the character described, a switch comprising a contact member and means for automatically moving said member to open the circuit through the switch, an arm adapted to hold the contact member against movement to open position, a shaft carrying said arm, and means for turning said shaft including a lever lengthwise adjustably secured thereto and an operating rod supported at one end of said lever and extending lengthwise of a machine to which the switch may be applied, said lever and arm extending in different radial directions relative to one another.

3. In devices of the character described, a switch comprising a contact member and means for automatically moving said member to open the circuit through the switch, an arm adapted to hold the contact member against movement to open position, a shaft carrying said arm, and means for turning said shaft from either side of a machine to which the switch may be applied, including spaced levers endwise adjustably secured to and extending radially of the shaft and rods connecting said levers, said arm extending in a different radial direction relative to the radial direction of said levers.

Signed at Detroit, Michigan, this 3rd day of May, 1918.

GEORGE GALPIN.
DAVID H. BAER.